United States Patent
Walter et al.

(10) Patent No.: US 8,355,540 B2
(45) Date of Patent: Jan. 15, 2013

(54) DETECTOR AND METHOD FOR IDENTIFYING A ROAD LANE BOUNDARY

(75) Inventors: Michael Walter, Neuravensburg (DE); Wladimir Klein, Lindau (DE); Dominik Maeder, Laupheim (DE)

(73) Assignee: ADC Automotive Distance Controls Systems GmbH (DE)

( * ) Notice: Subject to any disclaimer, the term of this patent is extended or adjusted under 35 U.S.C. 154(b) by 163 days.

(21) Appl. No.: 12/740,889

(22) PCT Filed: Oct. 18, 2008

(86) PCT No.: PCT/DE2008/001705
§ 371 (c)(1),
(2), (4) Date: Oct. 27, 2010

(87) PCT Pub. No.: WO2009/056095
PCT Pub. Date: May 7, 2009

(65) Prior Publication Data
US 2011/0081049 A1    Apr. 7, 2011

(30) Foreign Application Priority Data
Oct. 31, 2007   (DE) .......................... 10 2007 051 967

(51) Int. Cl.
*G06K 9/00* (2006.01)
*G06F 17/00* (2006.01)
(52) U.S. Cl. .......................................... 382/104; 701/65
(58) Field of Classification Search ............... 382/103, 382/104, 106, 199, 256; 340/901, 903; 701/493, 701/65, 80, 300, 301; 348/118, 169
See application file for complete search history.

(56) References Cited

U.S. PATENT DOCUMENTS
5,991,427 A * 11/1999 Kakinami et al. ............ 382/104
(Continued)

FOREIGN PATENT DOCUMENTS
DE    4435796 C1    12/1995
(Continued)

OTHER PUBLICATIONS
Kollreider, Klaus, Authorized Officer of EPO, International Search Report of PCT/DE2008/001705, With English Translation, Jun. 5, 20090.
(Continued)

*Primary Examiner* — Abolfazl Tabatabai
(74) *Attorney, Agent, or Firm* — RatnerPrestia

(57) ABSTRACT

A detector for identifying a road lane boundary using a digitalized optical image of the region in front of the vehicle. The detector includes a correlator configured to select the edges which are to be used for road lane estimation by searching for extreme values of convolution response, and to weight each convolution response by a weighting factor. A histogram analysis unit configured to group the extracted edges into pairs, and to determine a frequency distribution of the distances between two paired edges as a histogram, and to use said frequency distribution to determine the distances between two grouped edges forming a frequency peak or a frequency plateau in the histogram as nominal edge widths. A weighting factor determination unit configured to determine, for an edge, the weighting factor of the convolution response in the correlator in such a manner that the weight determined by the weighting factor for an edge of the paired edges is higher the smaller the deviation of the distance between the grouped edges from the nominal edge width.

10 Claims, 2 Drawing Sheets

U.S. PATENT DOCUMENTS 7,307,545 B2 * 12/2007 Nishida .......................... 340/901
7,720,580 B2 *  5/2010 Higgins-Luthman ........... 701/28

FOREIGN PATENT DOCUMENTS

| | | |
|---|---|---|
| DE | 10 2004 003 850 A1 | 8/2005 |
| EP | 1 089 231 A2 | 4/2001 |
| WO | WO2007/002964 A2 | 1/2007 |

OTHER PUBLICATIONS

Bertozzi M. et al., "Gold: A Parallel Real-Time Stereo Vision System for Generic Obstacle and Lane Detection", IEEE Transactions on Image Processing, IEEE Service Center, Piscataway, NJ, Vol. 7, No. 1., Jan. 1, 1998, pp. 62-80, XPOOO727376.

German Language Search Report for DE 10 2007 051 967.4, German Patent Office, Sep. 11, 2008.

* cited by examiner

Distance in cm

DETECTOR AND METHOD FOR IDENTIFYING A ROAD LANE BOUNDARY

CROSS REFERENCE TO RELATED APPLICATIONS

This application is the U.S. national phase application of PCT International Phase Application No. PCT/DE2008/001705, filed Oct. 18, 2008, which claims priority to German Patent Application No. 10 2007 051 967.4, filed Oct. 31, 2007, the contents of such applications being incorporated by reference herein.

FIELD OF THE INVENTION

The invention relates to a detector for identifying a road lane boundary and an associated method.

BACKGROUND OF THE INVENTION

In systems for identifying road lanes, image processing is based on edge detection. Classic versions select the edges which are to be used for road lane prediction by analysing the convolution responses. The N edges having the highest convolution responses are used, and their permutations are examined. The aforesaid approach enables proper functioning of the system in many cases since the contrast difference is usually highest between the road surface and the road surface marking.

In certain circumstances, however, structures can occur whose contrast difference, i.e. black difference, is high, but which are no road lane. These include, for example, headlights or reflectors which are reflected by the road in tunnels, thus causing road lanes to be estimated incorrectly.

SUMMARY OF THE INVENTION

An object of the present invention is to propose a detector and a method for identifying a road lane boundary which enable improved identification of a road lane boundary.

A central idea of at least one aspect of the invention is to complement a simple search for maximums of the convolution responses by a histogram analysis of the "raw" edges, in particular by using permutations of the edges which are located in a measuring window to form possible edge pairs and including the width of said edge pairs in a histogram. By weighting the edges, detection of the road lane boundary can be improved significantly. This is based on the fact that the edges can first be grouped into pairs and then the distribution of the frequencies of distances between two paired edges in the histogram can be determined. The edges belonging to a pair whose distance is very frequent in the histogram can be assumed to be the edges of a road lane boundary. This understanding is based on the assumption that road lane boundaries are more frequent than other image artifacts and reflections, so that the distance between two edges which represent a road lane boundary will also occur frequently in the optical image. If the edges which belong to a pair of "road lane boundary" edges are weighted high, detection of the road lane boundary can be improved significantly in an iterative approach.

The present invention has the advantage that by forming edge pairs and analyzing a histogram, the reliable and correct correlation of edges in the optical image to road lane boundaries can be increased significantly. In particular, the analysis of the distances between two edges can prevent that image artifacts, such as, for example, headlights which are reflected by the road, will be interpreted as road lane boundaries. This increases the robustness of road lane boundary identification and therefore also the robustness of a driver assistance system which is provided with a detector according to the invention.

According to one embodiment, the invention relates to a detector for identifying a road lane boundary using a digitalized optical image of a region in front of the vehicle, in which edges that are present are marked, wherein the detector has the following features:

a correlator designed to subject the edges which are marked in the optical image in an image segment of said optical image to a convolution correlation, and to weight the respective convolution response by a weighting factor in order to extract the edges having the N highest weighted convolution responses and to identify them as a road lane boundary, wherein N is a predefined natural number;

a histogram analysis unit designed to group the extracted edges into pairs, and to determine a frequency distribution of the distances between two paired edges as a histogram, and to use said frequency distribution to determine the distances between two grouped edges forming a frequency peak or a frequency plateau in the histogram as nominal edge widths; and a weighting factor determination unit designed to determine, for an edge, the weighting factor for a subsequent convolution correlation cycle in the correlator in such a manner that the weight determined by the weighting factor for an edge of the paired edges is higher the smaller the deviation of the distance between the grouped edges from the nominal edge width.

In another embodiment of the present invention, the weighting factor determination unit is designed to determine the weighting factor G(k) of an edge k on the basis of the target function $$G(k) = 1 - \frac{\text{edge pair width} - \text{nominal edge width}}{\text{maximum deviation}}$$

wherein the "edge pair width" variable is the distance between the grouped edges which are examined in each case and one of which is the edge k, the "nominal edge width" variable is the nominal width of the edge; and the "maximum deviation" variable is the maximum deviation between the edge pair width and the nominal edge width. The determination of the weighting factor in this manner enables a good and robust possibility to identify the edges detected in the optical image as road lane boundary in a rapid and reliable manner.

In another embodiment of the present invention, the histogram analysis unit is designed to take into account a frequency distribution in a previous iteration step when determining the frequency distribution of the distances between two paired edges. The use of such an iteration has the advantage that the frequency distribution can be determined even more precisely. This results from the fact that a larger database is available for calculating the frequencies of the distances between two paired edges.

Furthermore, it is also advantageous that in another embodiment the histogram analysis unit is designed to determine the nominal edge width in such a manner that, in case the value of a nominal edge width which has been determined exceeds a nominal edge width which has been determined in a previous iteration step, this higher value is used as nominal edge width. Such a design of the histogram analysis unit has the advantage of ensuring that with each iteration it is less probable that image artifacts having a very little distance between two edges are taken into account as nominal edge width. This in turn leads to a more robust image analysis of the optical image.

In another embodiment, the histogram analysis unit can also be designed to determine the nominal edge width in such a manner that, in case the value of a nominal edge width which has been determined is lower than a nominal edge width which has been determined in a previous iteration step, these two values determined for the nominal edge width are subjected to low-pass filtering. The advantage of such an embodiment of the present invention is also a more robust image analysis since said low-pass filtering serves to compensate for the effects of small-area image errors.

In addition, according to an embodiment of the present invention, the histogram analysis unit can be designed to calculate a plurality of histograms each of which is created assuming different pitch angles while the optical image is recorded, wherein the histogram analysis unit is further designed to select that pitch angle as valid on which the histogram having the most pronounced frequency peaks is based, and wherein the detector further comprises a conversion unit designed to use the optical image and the selected pitch angle to determine the real dimension of the road lane boundary in front of the vehicle. In addition to identifying road lane boundaries, such an embodiment of the present invention has the advantage that the histogram which has been created can also be used for other purposes. Since the determination of the pitch angle is important for converting the interrelationship of the edges in the optical image into the real situation in front of the vehicle, it is also helpful to estimate the pitch angle to determine the actual marking situation as regards the road lane boundary on the road.

In particular, the histogram analysis unit of an embodiment of the present invention can also be designed to identify the edges of a multiple marking by comparing the distances and frequencies of paired edges at least two different locations in the histogram where frequency peaks or frequency plateaus occur in the histogram. The advantage of such an embodiment is that multiple markings, which are often present on a road, can also be identified in a simple manner with the aid of the histogram which has been created.

It is also advantageous that the histogram analysis unit in another embodiment is designed to identify a double marking if a frequency peak or a frequency plateau is detected in the histogram whose width is two to three times and whose number of frequencies is half that of another frequency peak or another frequency plateau. Such an embodiment of the present invention provides a simple and at the same time robust and reliable approach to identifying the type of multiple marking which is most frequent on roads, namely a double marking.

In one embodiment, the present invention also relates to a method for identifying a road lane boundary using a digitalized optical image of the region in front of the vehicle, in which edges that are present are marked, wherein the method comprises the following steps:

correlating a marked edge in an image segment of the optical image in a convolution correlation, and weighting the convolution response by a weighting factor in order to extract the edges having the N highest weighted convolution responses and to identify them as a road lane boundary, wherein N is a predefined natural number;

creating and analysing a histogram in order to group the extracted edges into pairs, and to obtain a frequency distribution of the distances between two paired edges as a histogram, and to use said frequency distribution to determine the distances between two grouped edges forming a frequency peak or a frequency plateau in the histogram as nominal edge widths; and determining the weighting factor in order to determine, for an edge, the weighting factor for a subsequent convolution correlation determination cycle in the correlation step in such a manner that the weight determined by the weighting factor for an edge of the paired edges is higher the smaller the deviation of the distance between the grouped edges from the nominal edge width.

In order to be implemented in an efficient manner on a computer-based platform, according to another embodiment, the present invention can also be designed as a computer program having a program code for carrying out the aforesaid method if the computer program is executed on a computer.

Further advantages and possible applications of the present invention will be apparent from the following description in connection with the exemplary embodiments which are shown in the drawings.

BRIEF DESCRIPTION OF THE DRAWINGS

The invention is best understood from the following detailed description when read in connection with the accompanying drawings. Included in the drawings is the following figures.

DETAILED DESCRIPTION OF THE INVENTION

Figure 1:
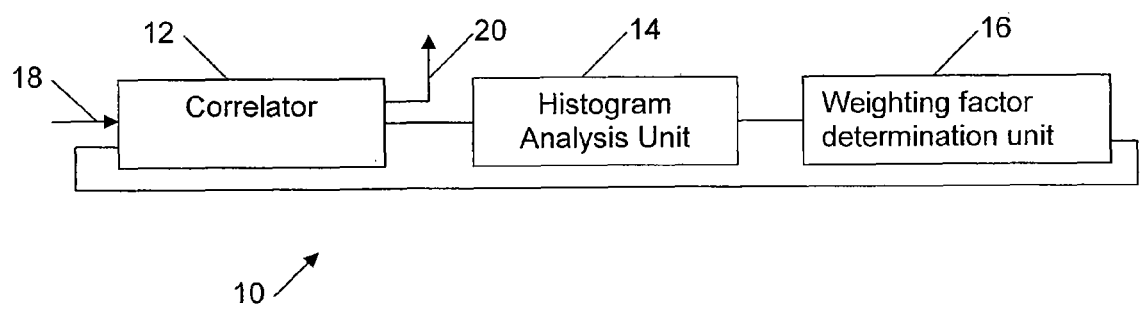
FIG. 1 shows a block diagram of an exemplary embodiment of the detector according to the invention.

In the following, identical and/or functionally equivalent elements can be denoted by the same reference numerals. The absolute values and dimensions which are mentioned in the following text are only exemplary values and do not constitute any limitation or restriction of the invention to such dimensions.

FIG. 1 shows a block diagram of an exemplary embodiment of the detector 10 according to the invention. The detector 10 comprises an correlator 12, a histogram analysis unit 14 which is connected to the correlator 12, and a weighting factor determination unit 16 which is connected to the histogram analysis unit and is further designed to provide the correlator 12 with the weighting factor which has been determined for the calculation of the convolution correlation in a subsequent iteration step.

The correlator 12 further comprises an input 18 which is intended to receive image data of the optical image in front of the vehicle. In this image data, the image edges (hereinafter only referred to as "edges" for the sake of simplicity) that are present are already marked, which can be done, for example, by subjecting the original digital image data to conventional edge detection.

Furthermore, the correlator 12 comprises an output 20, which enables information that an edge belongs to a road lane boundary to be transmitted to another component of a driver assistance system.

For operation of the detector 10, which is shown in FIG. 1, digitalized image data of the optical image of a region of the road in front of the vehicle, in which the edges are already marked, is provided to the correlator 12 via the input 18. The correlator 12 uses this image data (and a predefined initial value for the weighting factor of, for example, 1) to carry out a convolution correlation and to weight the resulting edges using the respective weighting factors. The edges having the highest weighted convolution responses are output as edges for identifying the road lane boundary to another component of a driver assistance system via the output 20.

Figure 2:
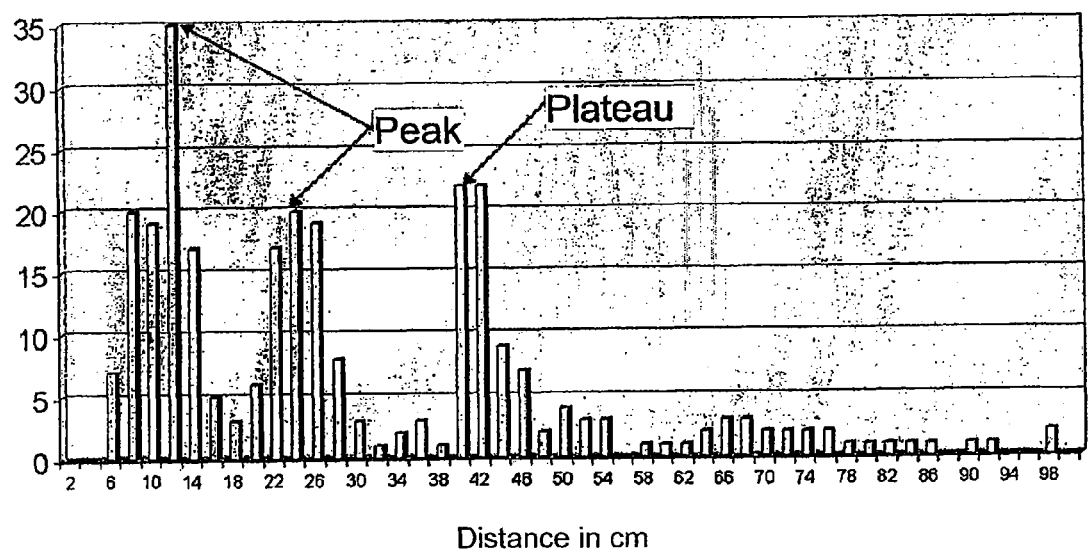
FIG. 2 shows an example of a histogram which has been created by the histogram analysis unit and in which the frequencies of distances of grouped edges are indicated.

To enable improved detection of the relevant edges, the image data of the optical image is forwarded to the histogram analysis unit 14, where the edges contained in said image data are grouped into pairs. Each edge pair grouped in this way is represented in a histogram, which shows the frequencies of the distances of the two edges of the edge pair (for example in 1 cm increments) in the image data. An example of such a histogram is shown in FIG. 2. Such a histogram is then used by the histogram analysis unit to determine the distance between the two edges of the edge pair where frequency peaks or frequency plateaus occur. A frequency peak is characterized by the fact that the number of frequencies for the specific distance is significantly higher than the frequencies of the adjacent distances in this histogram. A frequency plateau occurs if frequencies which are included in the histogram are within a tolerance range relative to adjacent distances, i.e. differ only by certain predefined frequencies of occurrence.

Subsequently, the weighting factor is adapted in the weighting factor determination unit 16. In the context of selecting the road lane boundary, this serves to give a higher weight to the edges whose distance to other edges is frequent in the image data. As, in line with expectations, road lane boundaries are the most frequent reason of edges which occur on the road, the road lane boundary can be identified in a more reliable manner in this way. To be specific, the weighting factor is a quality indicator for the edge and can reflect the slightest deviation of the edge pair permutations which have been examined from the nominal edge widths which have been determined. The quality is higher the higher the accuracy with which the width which has been analysed coincides with a maximum from the histogram. The weighting factor $G(k)$ of the edge k can, for example, be calculated on the basis of the above equation for $G(k)$.

The weighting factor which has been determined is subsequently transmitted to the correlator 12, which uses said factor in a subsequent iteration step. Such a recursive approach enables the edges of the road lane boundary to be identified much more reliably.

As another (ancillary) aspect, the histogram which has been created can also be used to estimate a pitch angle at which the camera providing the image data views the road. A more detailed explanation is given below. In this way, the resolution capability can be improved when the actual dimensions in front of the vehicle are estimated.

Finally, the histogram can also be used to identify multiple markings which are present on the road. This can in particular be done by comparing the absolute values of the frequencies and distances of the grouped edge pairs at frequency peaks or frequency plateaus.

Figure 3:
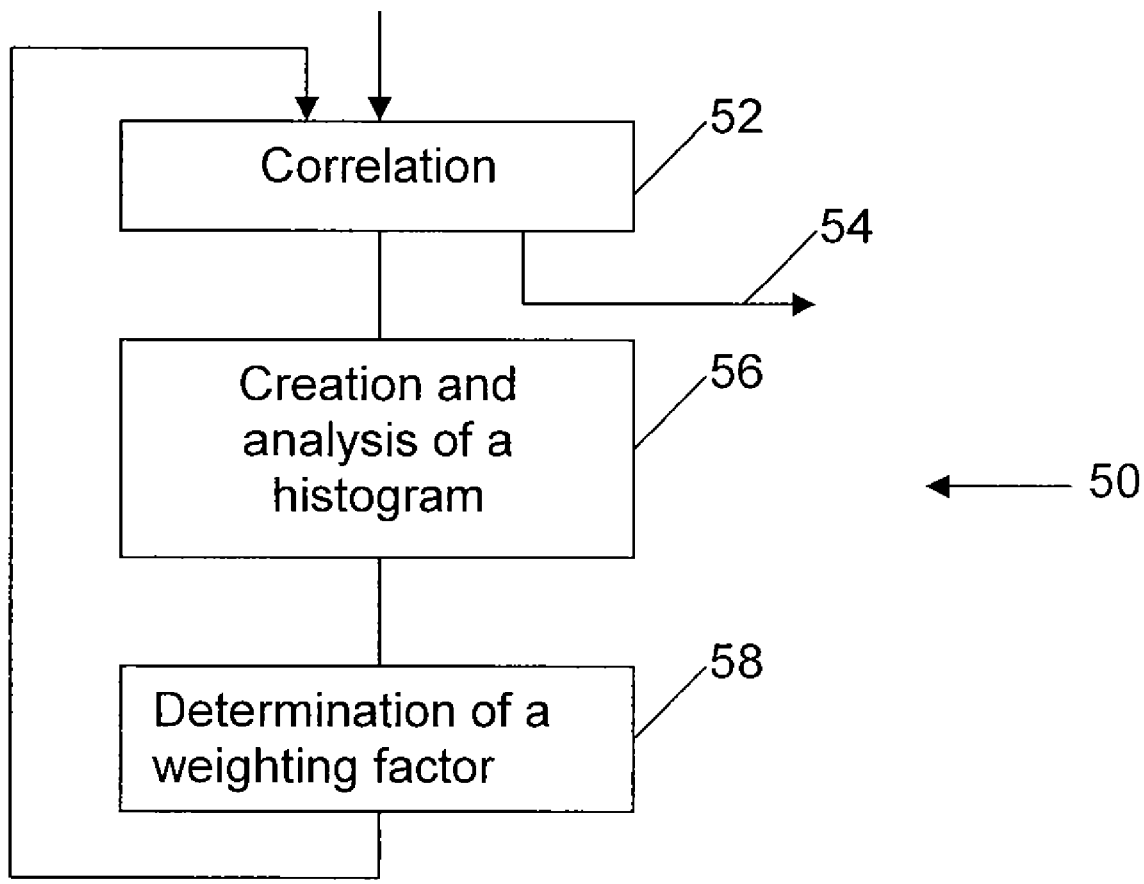
FIG. 3 shows a flow diagram of an exemplary embodiment of the method according to the invention.

Furthermore, FIG. 3 outlines a flow diagram 50 of an exemplary embodiment of the method according to the invention. Said method 50 comprises, in a first step 52, correlating a marked edge in an image segment of the optical image in a convolution correlation, and weighting the convolution response by a weighting factor in order to extract the edges having the N highest weighted convolution responses and to identify them as a road lane boundary, wherein N is a predefined natural number. The extracted edges can be provided to another unit of a driver assistance system (branch 54) in order to use the information on the position of the vehicle on the road in said driver assistance system. In another step 56, a histogram can be created and analysed in order to group the extracted edges into pairs, and to obtain a frequency distribution of the distances between two paired edges as a histogram, and to use said frequency distribution to determine the distances between two grouped edges forming a frequency peak or a frequency plateau in the histogram as nominal edge widths. In this way, particularly frequent distances between edges can be determined. In a last step 58, the weighting factor is determined in order to determine, for an edge, the weighting factor for a subsequent convolution correlation cycle in the correlation step 52 in such a manner that the weight determined by the weighting factor for an edge of the paired edges is higher the smaller the deviation between the distance between the grouped edges and the nominal edge width. In this way, edges which are arranged at a certain distance to another edge which is approximately equal to the width of a road lane boundary can be taken into account more than others. The weighting factor which has been determined can then be used in a subsequent correlation step, so that the road lane boundary will be identified more reliably with each iteration cycle.

In summary, it can be stated that for improved identification of a road lane boundary, the simple search for maximums of the convolution responses is complemented by a histogram analysis of the raw edges. For this purpose, the permutations of the edges which are located in a measuring window are used to form possible edge pairs. The widths of said edge pairs are included in a histogram. In said histogram, the frequency of occurrence of the widths is shown with a resolution of e.g. 1 centimetre.

To increase robustness and to take into account the chronological history, the histogram can be combined with that of the previous cycles. If, for example, the new value for an edge width is higher than the last one, the new value can be adopted. If this is not the case, both values can be subjected to low-pass filtering.

In a first initial scenario, the edges for predicting the road lane can be selected. Edge selection can be improved by analysing the histogram. For this purpose, the N highest extremes of the frequency distribution can be determined as nominal widths. For example, individual peaks on the one hand and plateaus on the other are extracted as maximums (see FIG. 2).

In a further iteration, for example, the width of all possible edge pair permutations is calculated once again. A weighting factor is determined for each edge. Said factor is a quality indicator for the edge and indicates the smallest deviation of the edge pair permutation which has been examined from the N nominal widths. The quality is higher the higher the accuracy with which the width which has been examined coincides with a maximum from the histogram. At the end of the iteration, the highest individual quality indicator for each edge is available.

The edges which are to be used for road lane estimation are furthermore selected by searching for extreme values of the convolution responses. Each convolution response is, however, weighted by its respective quality factor before the comparison operation.

In this way, edges which belong to an edge pair permutation lying near a maximum of the histogram will more probably be used for road lane prediction.

According to a second aspect of the invention, the pitch angle can be estimated. The histogram can also be used for further analyses. This is because the transformation of camera image coordinates into real world coordinates will be inaccurate if the pitch angle is set to a wrong value. As a result, width values which are identical in reality will deviate from each other at different camera distances. In the histogram, this is reflected by less pronounced extreme values. By calculating the histogram for several assumed angles, the angle corresponding to the most pronounced extremes can be selected as valid. The foregoing is a possibility of iteratively estimating the pitch angle.

According to a third aspect of the present invention, multiple markings can be identified. Furthermore, possible multiple markings can be inferred from an analysis of the maximums of the histogram.

A double marking is present, for example, if a maximum exists which corresponds to a width which is two to three times and to a frequency which is half that of another maximum.

The invention claimed is:

1. A detector for identifying a road lane boundary using a digitalized optical image of the region in front of the vehicle, the detector comprising:
a correlator configured to select the edges which are to be used for road lane estimation by searching for extreme values of convolution responses, and to weight each convolution response by a weighting factor before searching for extreme values;
a histogram analysis unit configured to group the extracted edges into pairs, and to determine a frequency distribution of the distances between two paired edges as a histogram, and to use said frequency distribution to determine the distances between two grouped edges forming a frequency peak or a frequency plateau in the histogram as nominal edge widths; and
a weighting factor determination unit configured to determine, for an edge, the weighting factor of the convolution response in the correlator in such a manner that the weight determined by the weighting factor for an edge of the paired edges is higher the smaller the deviation of the distance between the grouped edges from the nominal edge width.

2. A detector according to claim 1, wherein the weighting factor determination unit is configured to determine the weighting factor G(k) of an edge k on the basis of the target function $$G(k) = 1 - \frac{\text{edge pair width} - \text{nominal edge width}}{\text{maximum deviation}}$$

wherein the "edge pair width" variable is the distance between the grouped edges which are examined in each case and one of which is the edge k, the "nominal edge width" variable is the nominal width of the edge, and the "maximum deviation" variable is the maximum deviation between the edge pair width and the nominal edge width.

3. A detector according to claim 1, wherein the histogram analysis unit is configured to take into account a frequency distribution in a previous iteration step when determining the frequency distribution of the distances between two paired edges.

4. A detector according to claim 3, wherein the histogram analysis unit is configured to determine the nominal edge width in such a manner that, in case the value of a nominal edge width which has been determined exceeds a nominal edge width which has been determined in a previous iteration step, this higher value is used as nominal edge width.

5. A detector according to claim 3, wherein the histogram analysis unit is configured to determine the nominal edge width in such a manner that, in case the value of a nominal edge width which has been determined is lower than a nominal edge width which has been determined in a previous iteration step, these two values determined for the nominal edge width are subjected to low-pass filtering.

6. A detector according to claim 1, wherein the histogram analysis unit is configured to calculate a plurality of histograms each of which is determined assuming different pitch angles while the optical image is recorded, wherein the histogram analysis unit is further configured to select that pitch angle as valid on which the histogram having the most pronounced frequency peaks is based, and wherein the detector further comprises a conversion unit which is configured to use the optical image and the selected pitch angle to determine the real dimension of the road lane boundary in front of the vehicle.

7. A detector according to claim 1, wherein the histogram analysis unit is configured to identify the edges of a multiple marking by comparing the distances and frequencies of paired edges at least two different locations where frequency peaks or frequency plateaus occur in the histogram.

8. A detector according to claim 7, wherein the histogram analysis unit is configured to identify a double marking if a frequency peak or a frequency plateau is detected in the histogram whose width is two to three times and whose number of frequencies is half that of another frequency peak or another frequency plateau.

9. A method for identifying a road lane boundary using a digitalized optical image of the region in front of the vehicle, in which edges that are present are marked, wherein the method comprises the following steps:
selecting edges which are to be used for road lane estimation by searching for extreme values of convolution responses, wherein each convolution response is weighted by a weighting factor before searching for extreme values;
creating and analysing a histogram in order to group the extracted edges into pairs, and to obtain a frequency distribution of the distances between two paired edges as a histogram, and to use said frequency distribution to determine the distances between two grouped edges forming a frequency peak or a frequency plateau in the histogram as nominal edge widths; and
determining the weighting factor in order to determine, for an edge, the weighting factor of the determination of the convolution response in the correlation step in such a manner that the weight determined by the weighting factor for an edge of the paired edges is higher the smaller the deviation of the distance between the grouped edges from the nominal edge width.

10. A non-transitory computer readable medium having a computer program stored thereon for carrying out a method according to claim 9 if the computer program is executed on a computer.

* * * * *

UNITED STATES PATENT AND TRADEMARK OFFICE
CERTIFICATE OF CORRECTION

PATENT NO. : 8,355,540 B2  
APPLICATION NO. : 12/740889  
DATED : January 15, 2013  
INVENTOR(S) : Walter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

First Day of September, 2015

Michelle K. Lee
*Director of the United States Patent and Trademark Office*